US00RE34217E

United States Patent [19]

Edmark

[11] E Patent Number: Re. 34,217

[45] Reissued Date of Patent: Apr. 13, 1993

[54] MODULAR RACK UNIT

[76] Inventor: John Edmark, 2350 Broadway, Apt. 925, New York, N.Y. 10024

[21] Appl. No.: 847,341

[22] Filed: Mar. 6, 1992

Related U.S. Patent Documents

Reissue of:

[64] Patent No.: 5,078,278
Issued: Jan. 7, 1992
Appl. No.: 642,291
Filed: Jan. 17, 1991

[30] Foreign Application Priority Data

Jan. 23, 1990 [IL] Israel ..... 93138

[51] Int. Cl.[5] ..... A47F 7/00

[52] U.S. Cl. ..... 211/41; 211/194; 206/505

[58] Field of Search ..... 211/194, 40, 41, 59.4; 206/505, 507, 309, 387

[56] References Cited

U.S. PATENT DOCUMENTS 3,481,656 12/1969 Landers .
4,375,848 3/1983 Simpson et al. ..... 206/507 X
4,678,245 7/1987 Fouassier .
4,821,885 4/1989 Ondrasik ..... 206/505 X

FOREIGN PATENT DOCUMENTS 8710338 7/1987 Fed. Rep. of Germany .
PCT/EP88/-01199 12/1988 PCT Int'l Appl. .

*Primary Examiner*—Robert W. Gibson, Jr.
*Attorney, Agent, or Firm*—Davis Hoxie Faithfull and Hapgood

[57] ABSTRACT

A stackable modular unit for a storage structure for flat objects, having two lateral, mutually distanced, wall members to which are attached or with which are integral at least two bottom members and at least one top member. The bottom and top members define supporting and guiding surfaces for the object, the lateral walls are provided with cut-outs in their lower portions, the upper edges of the walls and the cut-outs so configured as to permit, in the stacked state of the units, the nesting of the upper portion of each lateral wall of each unit in the cut-out of the corresponding wall of the next-higher of the stacked units. Any one of the objects, when introduced into, and slid onto the bottom members of, the nth of the stacked units, mechanically joins the nth unit to the (nth-1) unit.

5 Claims, 5 Drawing Sheets

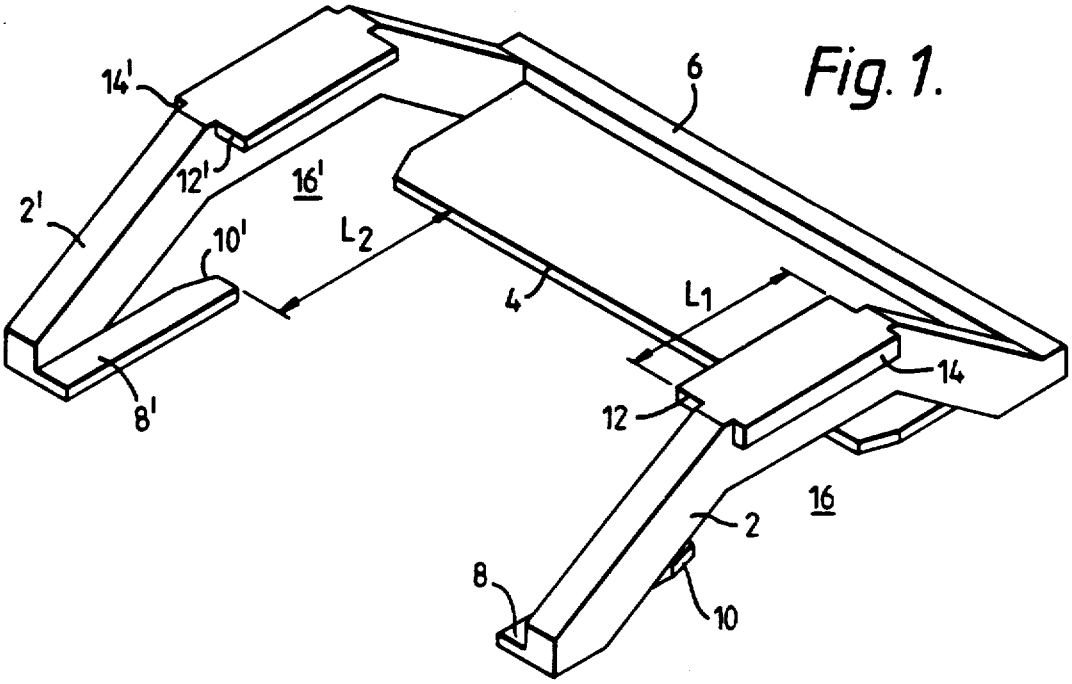
Fig. 1.
Fig. 4.
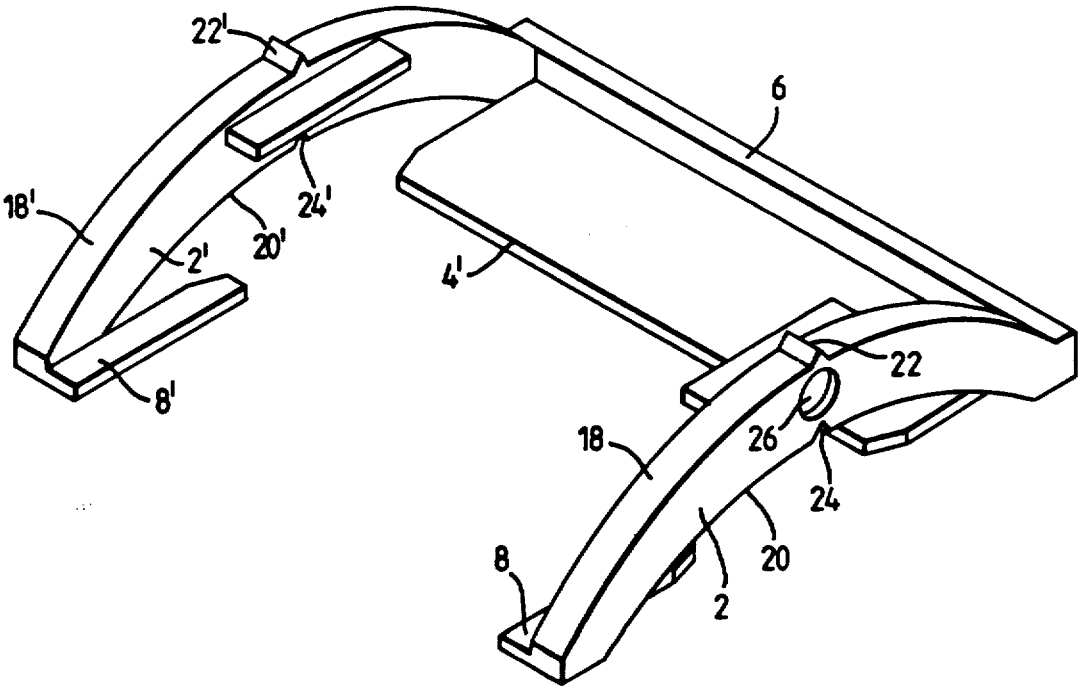

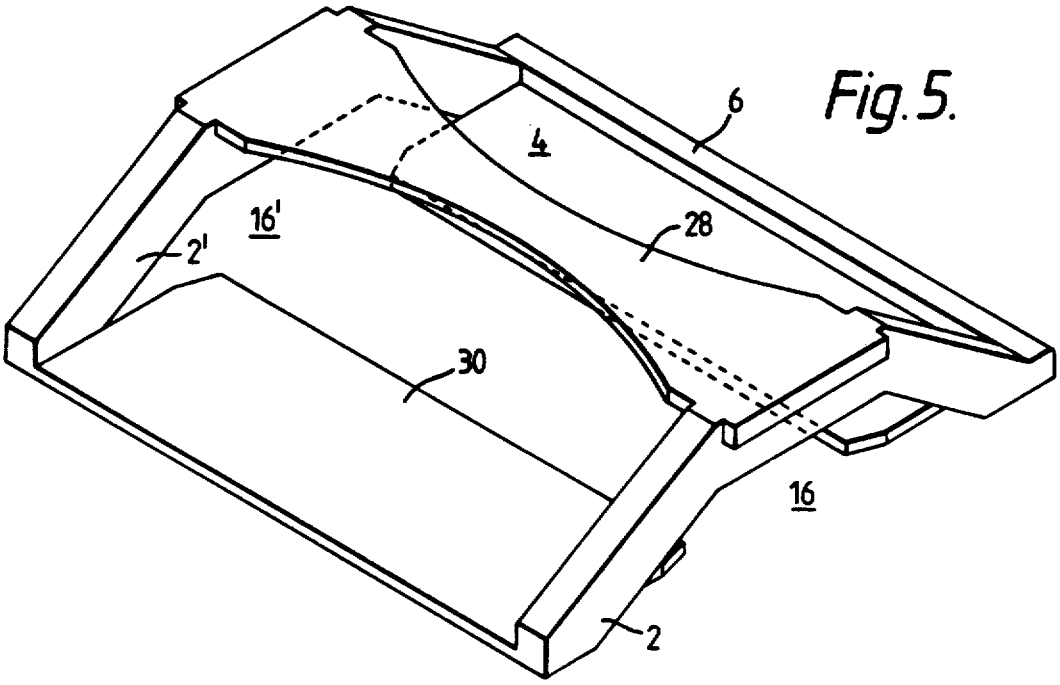
Fig. 5.
Fig. 6.
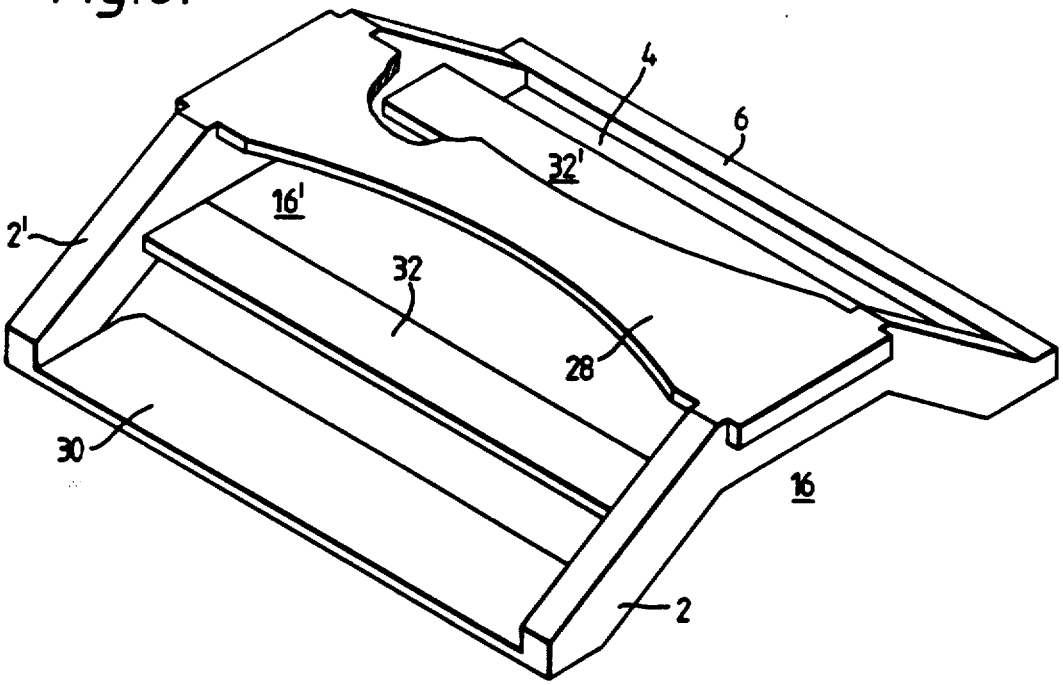

MODULAR RACK UNIT

Matter enclosed in heavy brackets [ ] appears in the original patent but forms no part of this reissue specification; matter printed in italics indicates the additions made by reissue.

The present invention relates to a stackable modular unit for a storage structure for flat objects, particularly, but not exclusively, for compact-disc cases.

Storage structures for such objects are known and have the form of racks comprising a number of compartments or shelves into which the compact-disc cases can be slid.

These known racks have at least two disadvantages, one being aesthetical, the other, functional. Aesthetically, they are unsatisfactory because, unless they are fairly full, attention is more often than not drawn to the empty portion thereof, producing a curiously unfinished look. Functionally, the very integrality of these racks is frequently a disadvantage: When, for instance, a newly acquired symphony complementing an existing sequential series of symphonies has to be put in place, all the discs above that new acquisition have to be removed from their respective shelves.

Other known storage structures avoid the first of the above-mentioned disadvantages, consisting as they do of individual drawerlike containers configured to be stackable, some of which are provided with means, often quite complex and demanding a considerable degree of accuracy in manufacturing, for mutual attachment. Yet none of these known devices is as simple, inexpensive and aesthetically pleasing as the stackable unit of the present invention, nor do they, in the manner of the present invention, use the very objects to be stored as a means for the mutual joining of the separate containers.

It is one of the objects of the present invention to overcome the drawbacks and disadvantages of the prior-art storage structures and to provide a structure that at any instant need not comprise more storage space than required for an existing collection of compact discs, yet is enlargeable at will, being made up of separate, stackable modular units that are linked to one another by the very act of insertion, into the stacked units, of the disc cases to be stored, a coherence that is eliminated at any point such a case is withdrawn, thereby permitting intercalation of another disc case at any point without need for relocation of already stored cases.

This, according to the invention, is achieved by providing a stackable modular unit for a storage structure for flat objects, comprising two lateral, mutually distanced, wall members to which are attached or with which are integral at least two bottom members and at least one top member, said bottom and top members defining supporting and guiding surfaces for said object, said lateral walls having cutouts in their lower portions, the upper edges of said walls and said cut-outs being so configured as to permit, in the stacked state of said units, the nesting of the upper portion of each lateral wall of each unit in the cut-out of the corresponding wall of the next-higher of said stacked units, wherein any one of said objects, when introduced into, and slid onto the bottom members of, the nth of said stacked units, mechanically joins said nth unit to the (nth−1) unit.

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

IN THE DRAWINGS

FIG. 1 is a perspective drawing of a first embodiment of the modular unit according to the invention;

FIG. 4 is a perspective view of another embodiment of the invention. in which the lateral walls are arcuate;

FIG. 5 represents a third embodiment, in which the two top supporting strips have been laterally extended, and joined to form a handle-like bridge;

FIG. 6 is a perspective view of yet another embodiment which is provided with intermediate supporting surfaces:

Figure 2:
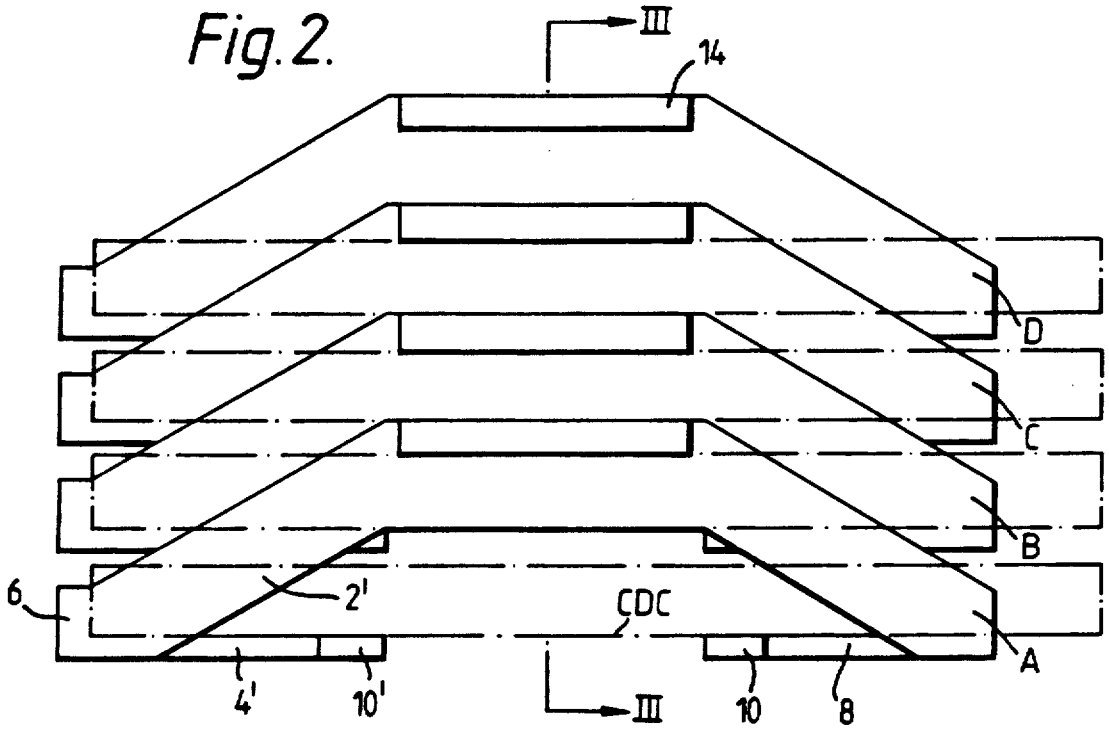
FIG. 2 represents a side view of several stacked units of the embodiment illustrated in FIG. 1.
Figure 3:
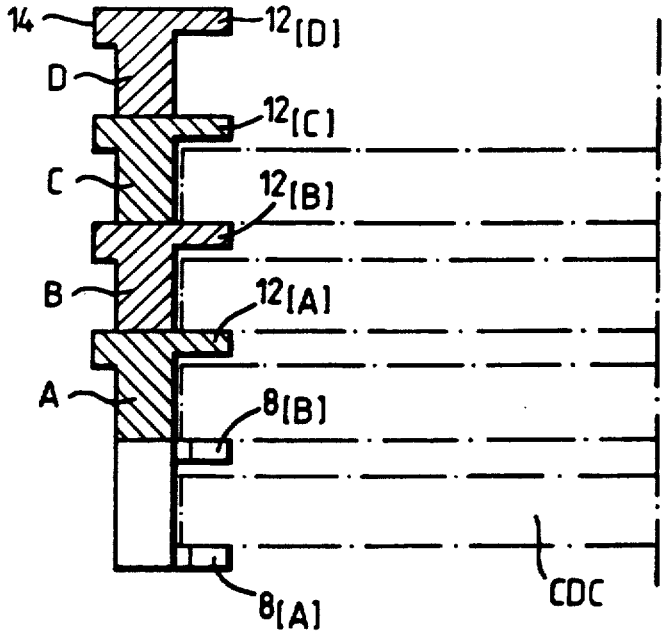
FIG. 3 is a partial view, in cross-section along plane III—III, of the stack shown in FIG. 2.

Referring now to the drawings, there is shown in FIG. 1 a modular unit according to the invention, seen to consist of two lateral wall members 2,2' joined by a rear bottom supporting member 4 including a rail 6 which advantageously serves both for reinforcement and as an abutment for the inserted compact-disc (CD) indicated by dash-dotted lines in FIGS. 2 and 3.

Also seen are two relatively narrow, strip-like front bottom supporting members 8, 8' which project towards the inside of the unit and are provided with chamfers 10 which, as will be shown further below, facilitate stacking of the units.

Further show are two top supporting members 12, 12', the length $L_1$ of which is slightly less than the distance $L_2$ between the front edge of the rear bottom supporting member 4 and the rear edges of the front supporting members 8,8'. Gripping ledges 14,14' serve to facilitate lifting up of the entire stack or parts thereof.

The lateral members 2,2' are seen to have in their lower portions cut-outs 16,16'. The upper edges of the lateral members 2,2' and the cut-outs 16,16' are so configured as to permit, in the stacked state of the units, the nesting of the upper portion of each lateral members 2,2' of each unit in the cut-out of the corresponding wall of the next-higher of the stacked units, as is clearly seen in FIG. 2: Unit A is nested in unit B, unit B in unit C, and unit C in unit D. Unit D. being in this drawing the uppermost unit in the stack, is obviously not nested.

From FIGS. 2 and 3 another important feature of the unit according to the invention emerges: In the stacked state of the units, the top members 12,12' of the nth unit, say, unit B are co-planar with the bottom members 4,8,8' of the (nth+2) unit (counting from below), i.e., unit D. This is the structural basis for one of the main characteristics of the present invention: A CD-case (CDC) fully introduced into one of the stacked units will mechanically join this unit to the next lower unit. Thus if a CD-case is slid into, say, unit D, it will, by its mere presence, link unit D and unit C, as this CD-case is located below the top supporting members 8,8' of unit C (see FIGS. 2 and 3). Therefore, if units B and C, too, are occupied, the whole stack (A,B,C,D) becomes coherent and can be lifted up by lifting unit D. Conversely, this coherence is eliminated whenever a CD-case is withdrawn from a unit. Thus if the case is withdrawn from unit B, coherence is broken at that point, and unit A is no longer linked to the rest of the stack. In this way it is possible to intercalate an additional CD-case (in its unit) at any point without having to relocate the higher-up cases.

It is clearly seen (FIG. 2) that in the two lowermost units of a stack, the gap between the rear edge of the front bottom supporting members 8,8', and the front edge of the rear bottom supporting member (=the distance $L_2$ in FIG. 1) is not bridged as it is in the higher units (starting from unit C), since, as explained earlier, the top supporting members 12,12' of a unit in a stack are co-planar (=serve as bridging members) with the bottom members 4,8,8' of a unit two "floors" higher ("nth+2"). Consequently, the first "floor" to have a top member 12,12' co-planar with its own bottom members 4,8,8' is the third "floor," i.e., unit C. Nevertheless, by taking slight care, upon introduction of a CD-case, not to let the leading edge of the case "drop" into the above defined gap, it is quite easy to introduce cases also into the two lowermost units.

Still, for greater convenience, the invention also provides a simple attachment which, inserted into the cut-outs 16,16' of the lowermost unit A, provides the missing "bridging" members. The attachment will be explained in conjunction with FIG. 8.

Stability and proper mutual location of the stacked units in the front-to-back direction is ensured by the geometry of the nesting arrangement, while proper location in the left-right direction is taken care of by the lateral edges of the front and rear bottom supporting members 4,8,8'.

The embodiment of FIG. 1 is advantageously made by the injection-molding process from one of the industrial plastics. In this case, the lateral wall members 2,2' are likely to be ribbed or coffered, rather than solid as shown for the sake of simplicity. If so, the gripping ledges 14 might be superfluous, as the recesses produced by the ribbing pattern should provide enough purchase to the fingers to lift up the stack or parts thereof.

FIG. 4 illustrates a second embodiment of the stackable unit according to the invention. Here, the lateral wall members 2,2' are arcuate, being defined by an upper arc 18,18' and a lower arc 20,20'. It should be noted that these arcs are not, as would appear, concentric, but have the same radius, which is obviously required for proper nesting when stacked. Here, however, because of the arcuate geometry, special provision must be made to ensure proper mutual location of the units in the front-to-back direction. This is achieved by a simple detent arrangement comprising a tapering projection 22,22' on the upper arcs 18,18', which, upon stacking, indexes in a V-shaped notch 24,24' provided in the lower-arc surfaces 20,20' of the next-higher unit.

The cylindrical recess 26 (provided also on the other lateral wall 2') is for lifting.

Yet another embodiment is illustrated in FIG. 5. It basically resembles that of FIG. 1, but has been made heavier and sturdier by addition of the single, handle like top supporting member 28 that replaces the two separate members 12,12', and the single front bottom supporting member 30 which replaces the two separate members 8,8'.

FIG. 6 represents a variant of the previous embodiment, inasmuch as the unit shown here is provided with intermediate supporting members 32,32' and much narrower one-piece bottom supporting members 4 and 30. Upon stacking, the relatively narrow intermediate members 32 are co-planar with the bottom members 4, 30 of the next-higher unit, and the top member 28 of the next-lower unit.

Figure 7:
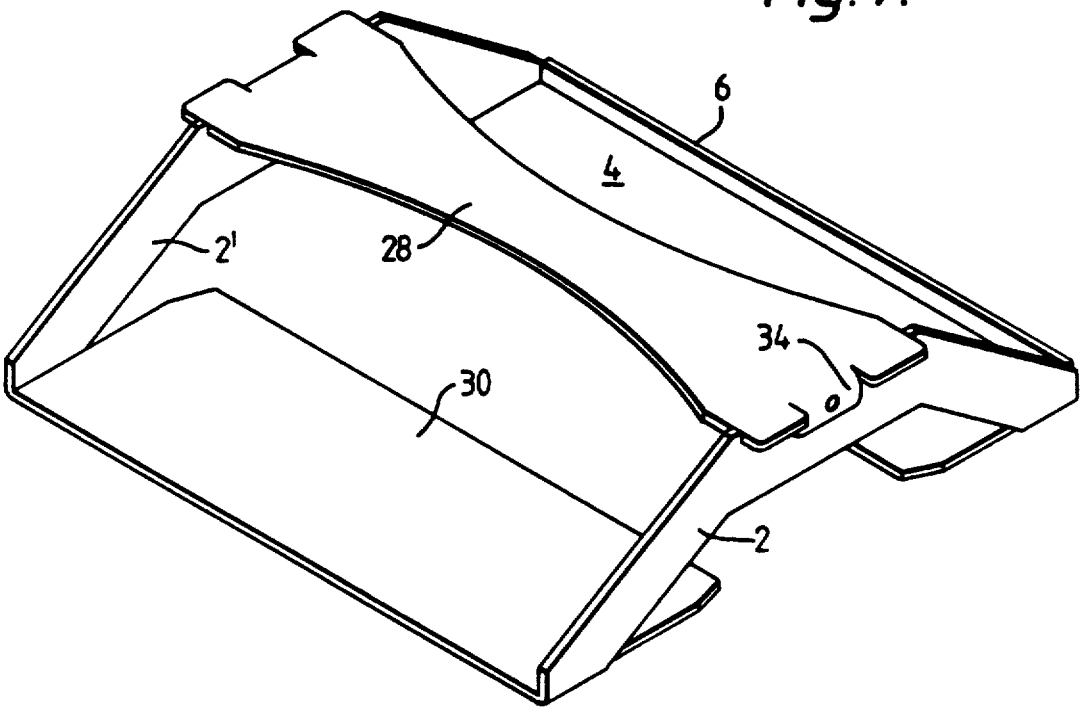
FIG. 7 illustrates a sheet-metal embodiment of the modular unit according to the invention.

The sheet-metal embodiment of FIG. 7 which includes all the essentials of the embodiment of FIG. 5 is made of a one-piece blank, except for the handle-like top member 28. The latter has tabs 34 cut from the ends of member 28, which tabs, bent downwards, serve to rivet or spot-weld the top member 28 to the lateral wall members 2,2'. Not shown are rib-like reinforcing projections advantageously embossed in the lateral wall members 2,2' to enhance their mechanical strength.

Figure 8:
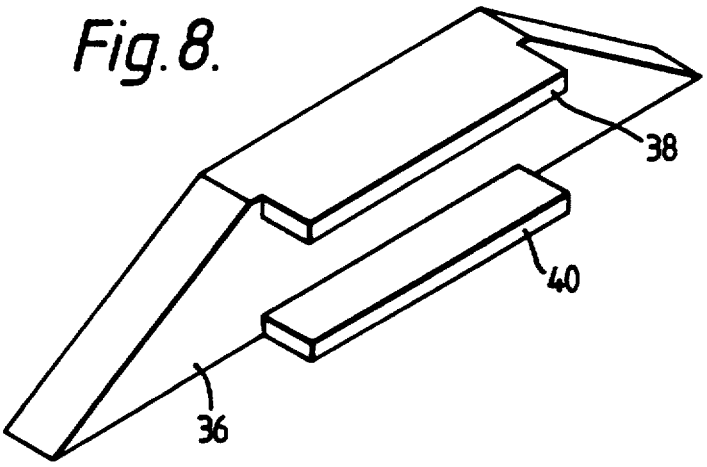
FIG. 8 is a perspective view illustrating an attachment to facilitate introduction of CD-cases into the lowermost units in a stack.

FIG. 8 illustrates the above mentioned attachment that supplies the missing "bridging members" of the two lowermost units in each stack and is particularly suitable for the embodiment of FIGS. 1,5 and 6, and of which two are required per stack. There is seen a trapezoidal piece 36 configured to fit, and fill, the cut-outs 16,16' of the units. Attached to, or integral with, this piece are two top-supporting member "substitutes" 38,40. The attachment is intended to be cemented into the cut-outs 16,16' of the lowermost unit of a stack. An abutment 42 prevents the piece from being pushed in too far, and a spring-loaded ball detent 44 provides friction to keep the attachment in place.

Differently shaped cut-outs 16,16', such as those of the embodiment of FIG. 4 need of course different lateral walls 38,38'.

Figure 9:
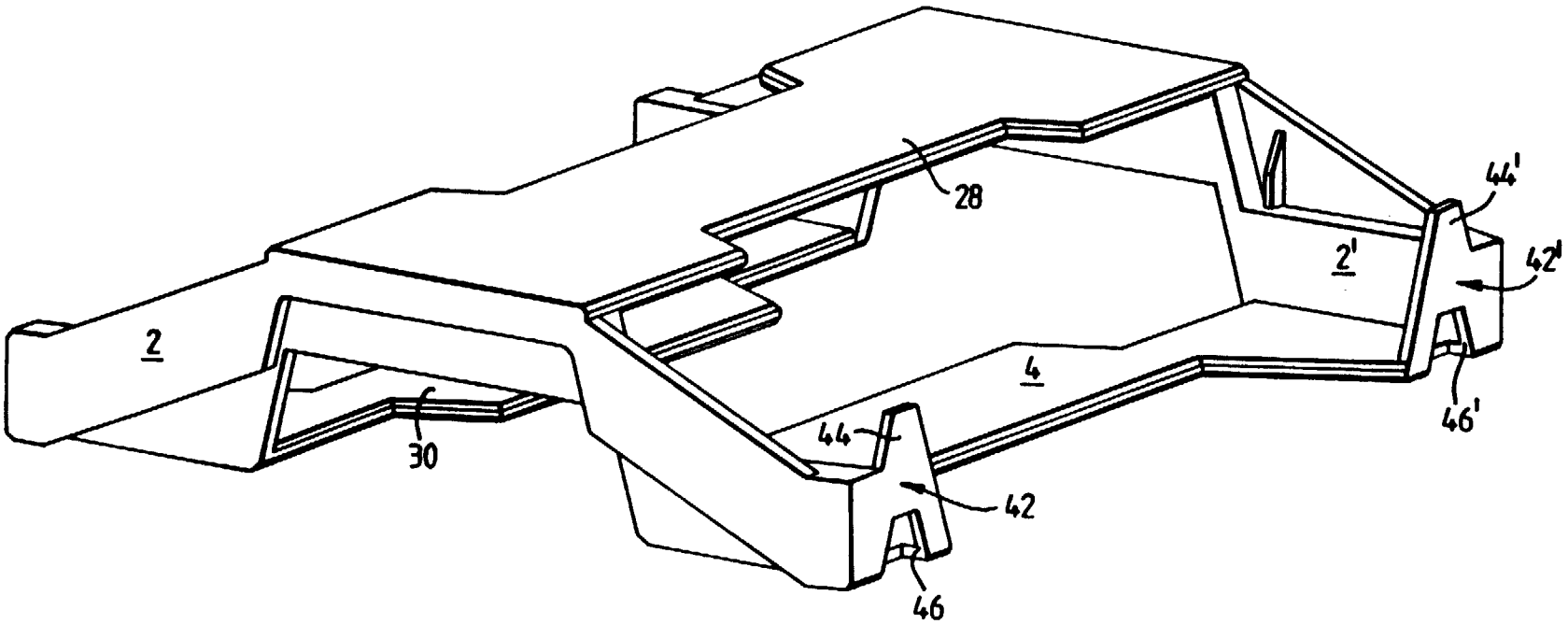
FIG. 9 represents yet another embodiment.

A preferred embodiment of the modular unit according to the invention is seen in FIG. 9. While the general design resembles that of the embodiment of FIG. 5, showing apart from the lateral member 2,2' also the front and rear bottom support members 30,4, there are now seen, instead of the relatively low abutment or stop rail 6, two distinct back stops 42,42' which, for reasons explained below, are much higher than appears to be necessary in order to serve as back stop for the CD-case accommodated in their unit.

When a stack of, say, four units, A,B,C,D, as in FIG. 2, are filled with, in this case, four CDC's there remains in the uppermost unit D what may be called a pseudo-slot into which a further CDC could be placed, although the slot is not complete, lacking as it does the front and rear bottom support members 30 (in FIG. 2 represented by the members 8) and 4, which could only be supplied by a further unit. E. However, while the top surface of the "handle" 28 (in FIG. 2 represented by the member 14) of the unit C will support an additional CDC, the absence, in this pseudo-slot, of a backstop makes proper and secure placing of that additional CDC difficult. The backstops 42,42' solve this problem by being high enough for the tapered members 44,44' of what happens to be the uppermost unit to reach above the plane containing the CDC-carrying surfaces of what would be the bottom-support members of a next-higher unit. Within the stack (i.e., when not being part of an uppermost unit). the tapered members 44,44' of one unit are accommodate in tapered cut-outs 46,46' of the next higher unit.

It should be understood that the different features of the embodiments shown above can be combined in various ways to produce different embodiments. Also, for various uses of the storage-structure units according to the invention, two sided access to the units might be advantageous, in which case the abutment rail 6 or the backstops 42,42' can be dispensed with.

It will be evident to those skilled in the art that the invention is not limited to the details of the foregoing illustrative embodiments and that the present invention may be embodied in other specific forms without departing from the spirit of essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A stackable modular unit for a storage structure for flat objects, comprising:

two lateral, mutually distanced, wall members each having an upper portion and a lower portion to which members are attached or with which are integral at least two bottom members and at least one top member, at lest one of said bottom members joining, and maintaining at a distance, said lateral wall members, said bottom and top members defining supporting and guiding surfaces for said object;

said lateral wall members having cut-outs in their lower portions, the upper portions of said wall members and said cut-outs being so configured as to permit, in the stacked state of said units, the nesting of the upper portion of each lateral wall member of each unit in the cut-out in the lower portion of the corresponding wall member of the next-higher of said stacked units;

wherein any one of said objects, when introduced into, and slid onto the bottom members of, the nth of said stacked units, mechanically joins said nth unit to the (nth − 1) unit.

2. The modular unit as claimed in claim 1, wherein in said stacked state the top member or members of the nth unit are substantially coplanar with the bottom members of the (nth + 2) unit, counting from below.

3. The modular unit as claimed in claim 1, further comprising at least two intermediate members attached to, or integral with, said lateral wall members.

4. The modular unit as claimed in claim 3, wherein, in the stacked state of said units, the intermediate members of the nth unit are substantially co-planar with the bottom members of the (nth + 1) unit and with the top member or members of the (nth − 1) unit.

5. The modular unit as claimed in claim 1, further comprising at least one backstop means, an upper member of which reaches above the plane containing the object-carrying surfaces of said bottom members of the next-higher unit in a stack of stacked units.

* * * * *